United States Patent

[11] 3,631,405

[72] Inventors George S. Hoff
Sudbury, Mass.;
Richard P. Kelly, Nashua, N.H.
[21] Appl. No. 875,900
[22] Filed Nov. 12, 1969
[45] Patented Dec. 28, 1971
[73] Assignee Honeywell, Inc.
Minneapolis, Minn.

[54] SHARING OF MICROPROGRAMS BETWEEN PROCESSORS
21 Claims, 6 Drawing Figs.

[52] U.S. Cl. .......... 340/172.5
[51] Int. Cl. .......... G06f 9/12, G06f 15/16
[50] Field of Search .......... 340/172.5

[56] References Cited

UNITED STATES PATENTS

Re 26,171 3/1967 Falkoff .......... 340/172.5
3,348,210 10/1967 Ochsner .......... 340/172.5
3,480,914 11/1969 Schlaeppi .......... 340/172.5
3,496,551 2/1970 Driscoll et al. .......... 340/172.5

*Primary Examiner*—Gareth D. Shaw
*Assistant Examiner*—R. F. Chapuran
*Attorneys*—Fred Jacob, Leo Stanger, Lester S. Hecht and Faith F. Driscoll

ABSTRACT: A multiprocessor system includes two microprogrammed processors, each having a different instruction repertoire and capable of executing separate programs or portions thereof independently. Both processors share a common memory unit and communicate through established groups of memory storage locations. One processor is word-oriented and processes data using a fixed word format while the other processor is character-oriented and processes data using a variable length format. The microprogrammable control elements of both processors are interconnected to permit the fixed word processor to share microprograms of the variable length processor for executing instructions not included in its repertoire.

INVENTORS
GEORGE S. HOFF
RICHARD P. KELLY
BY Faith F. Driscoll
ATTORNEY

INVENTORS
GEORGE S. HOFF
RICHARD P. KELLY

BY Faith F. Driscoll

ATTORNEY

INVENTORS
GEORGE S. HOFF
RICHARD P. KELLY

BY

Faith F. Driscoll

ATTORNEY

INVENTORS
GEORGE S. HOFF
RICHARD P. KELLY
BY Faith F. Driscoll
ATTORNEY

SHARING OF MICROPROGRAMS BETWEEN PROCESSORS

BACKGROUND OF THE INVENTION AND OBJECTS

The subject invention relates to data processing systems and in particular, to multiprocessor systems which employ processors having different instruction sets and which operate under the control of individual control elements.

In order to more expeditiously process instructions of one or more programs, processors have been designed to include highly specialized instruction repertoires (i.e. square root, logarithm, etc.). With the advent of microprogramming, certain type of instructions are made readily performable through special microprograms stored in a control element (e.g. read only memory). In order to reduce the control memory storage requirements attendant with the storing of additional microprograms and the additional complexity of sequencing hardware of individual processors, prior art systems have utilized subroutines including several program instructions each of which are executable through available microprograms. However, as in conventional programming, the utilization of subroutines to execute certain operations not within the existing instruction set has proved time consuming.

In a further effort to reduce the complexity of processor control hardware, the prior art has limited the instruction set of the individual processors of a multiprocessor system and required that each processor to be specially programmed to process different instruction program segments. Here, the programmer is required to insert special instructions at particular points in each program for transferring different portions thereof to and from those memory areas assigned to each of the processors. Arrangements of this type have the disadvantages of both adding to the programmer's burden and to the amount of valuable computing time expended in processing such transfers.

Other prior art systems include an executive or supervisory program in the multiprocessor system for directing the assignment of tasks and the necessary transfer and control functions among individual system processors (i.e. housekeeping scheduling operations relating to the assignment of program and data segments). Because it is difficult to provide a natural and efficient division of tasks among processors, the supervisory program is made exceedingly complex. Further, the system supervisory program expends large amounts of time performing those operations necessary to accomplish the aforementioned assignment and scheduling functions. More importantly, the time for processing each function can be exceedingly long causing unnecessary delays to the programs undergoing processing by the individual processors.

Accordingly, it is a primary object of the subject invention to provide a multiprocessor system which includes processors having different instruction sets wherein a processor during the execution of a program is able to share the instruction set of another processor for executing program instructions not within its own set.

It is a further object of the subject invention to provide a multiprocessor system wherein task assignment is made natural and efficient by having a word-oriented processor execute instructions of a program which specify operations more efficiently processed using a fixed word data format and a character-oriented processor execute instructions of the same program which specify operations more efficiently processed using a variable length or character data format.

It is a more specific object of the subject invention to provide a system including two microprogrammed processors, each having a different instruction repertoire wherein at least one processor during the execution of a program is able to share one or more microprograms of the other processor to execute any instructions occurring within the program which are not within its own set.

It is still a further object of the subject invention to provide a technique for sharing the microprograms stored within the microprogrammed control elements of at least two processors with a minimal increase to the hardware and a minimal increase in the storage requirements of either control element.

SUMMARY OF THE INVENTION

The present invention provides an improved multiprocessor system by utilizing processors each having different instruction repertoires. The processors share a common memory and are interconnected through their individual control elements to share the instruction set of the other processor for executing those instructions not within its own set.

In the illustrated embodiment of the present invention, both processors include microprogrammed control elements and process data using different data formats. One processes data using a fixed word format while the other processes data using a variable length or character format. The mulitprocessor system of the preferred embodiment is multiprogrammed in that both the word-oriented and character-oriented processor can concurrently execute more than one program. In accordance with the teachings of the subject invention, all instructions in the programs to be processed by the word processor which specify operations more efficiently executed by the character processor are coded for execution by same.

During normal program processing, when the word-oriented processor encounters a type of instruction either not included in its repertoire coded as one (e.g. a privileged instruction) which is to be executed by the character processor, it traps the instruction to the system supervisory program. The supervisory program codes the instruction in character format and includes an appropriate key code and base relocation address of the originating program. This allows the character processor to assume the identity of the originating program for accessing areas of memory assigned to the program when executing the operation specified by the instruction. The supervisory program through the facility of the word processor signals the character processor via its microprogrammed control element. When signaled, the character processor enters a special microinstruction sequence which simulates the normal instruction fetch phase to automatically store indications of the state of the machine and fetch the word processor program instruction from the predetermined storage area. Further, the machine is placed in a special operating mode. The special microinstruction sequence returns the microprogrammed control element to a point where the operation specified by the instruction is executable through microprograms used by the character processor for normal execution of instructions of its own program.

Upon completion of execution, the character processor signals the word processor through its microprogrammed control element. The character processor then restores its original machine state prior to entering its special mode and returns to normal processing. The word processor, up to now, stalled pending completion of the execution of the character processor's instruction resumes normal program processing upon receipt of the character processor signal.

By directly interconnecting the control elements both processors communicate directly and efficiently with minimal hardware. Additionally, enabling one of the processors to share the existing microprograms included within the control element of the other processor, the processor in effect extends or augments its instruction repertoire with little increase to the control memory storage requirements (i.e. control element) of the other processor.

The above and other objects of the present invention are achieved in several illustrative embodiments described hereinafter. The novel features which are believed to be characteristic of the invention, both as to its organization and method of operation, together with further objects and advantages thereof will be better understood from the following description considered in connection with the accompanying drawings. It is to be expressly understood, however, that each of the drawings are for the purpose of illustration and description only and are not intended as a definition of the limits of the invention.

DESCRIPTION OF PREFERRED EMBODIMENT

The present invention finds application primarily in a multiprocessing system including two or more processing units each having different instruction sets which share a common main memory.

Figure 1:
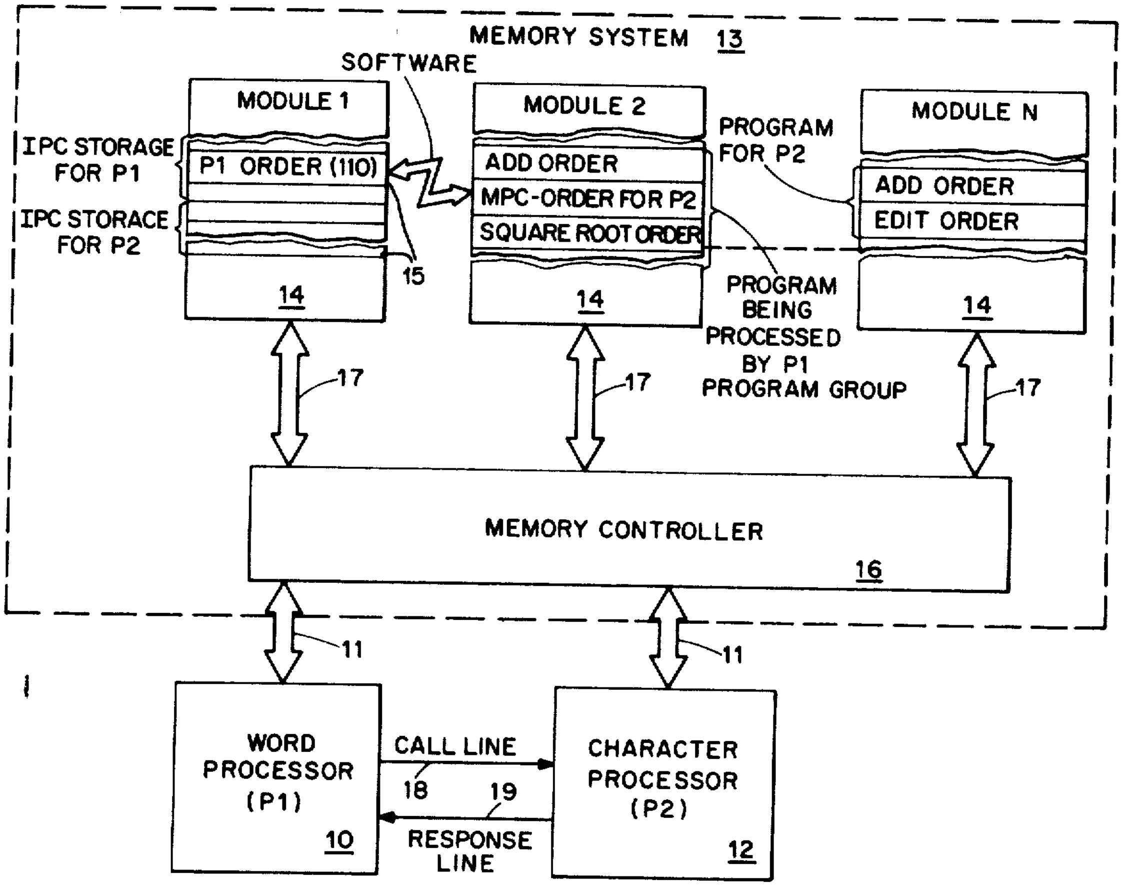
FIG. 1 is a diagrammatic illustration of a multiprocessing system embodying the present invention.
Figure 1A:
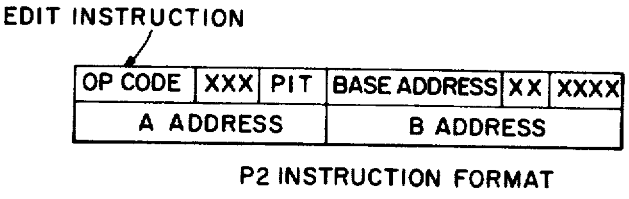
FIG. 1*a* illustrates the format of an order executable by the character processor 12.

Referring now to FIG. 1, there is shown a multiprocessor system incorporating the present invention, which includes a word-oriented and character-oriented processor 10 and 12 respectively, each capable of independent and simultaneous operation. The system shown is also multiprogrammed in that both the word and character processors can concurrently execute more than one program. In the illustrated embodiments the word processor 10 can execute concurrently up to eight user programs and operates on fixed length data fields That is, a 48 bit word as the unit of information. One kind of processor which operates in this manner is disclosed in U.S. Pat. No. 3,201,762 assigned to the assignee of the present invention.

The character processor 12 can execute concurrently up to two user programs and operates on variable length data field; using an eight-bit character as a unit of information. Although processor 12 may be characterized as a single-character processor, it can manipulate up to four character groups and interpret instructions having two, three or four character length addresses. For an example of a processor having a similar capability, reference should be made to U.S. Pat. No. 3,331,056 assigned to the assignee of the subject invention.

Because of the above-mentioned differences in data formatting, the system of FIG. 1 can efficiently accommodate programs oriented to both word and character processing. A monitor or supervisory program termed Master Program group controls the assigning of tasks to the word and character processors 10 and 12 to produce a natural and efficient division of labor. That is, the word processor 10 is assigned tasks to all high speed data processing and scientific computation while the character processor 12 is assigned tasks associated with communications and editing functions.

In the illustrated embodiment, the aforementioned multiprogramming in the word processor 10 is performed by a traffic control element which multiprogramming element passes control sequentially to the different program groups on a demand basis. Also, the word processor includes control memory storage for each program group which takes the form of a plurality of control memory storage registers. These control storage registers may include sequence counters, cosequence counters, unprogrammed transfer registers, index registers, interrupt registers, masking registers and working storage registers used for directing the execution of its program. The traffic control element and control memory storage arrangement referred to above is further described in U.S. Pat. Nos. 3,209,414 and 3,201,762 assigned to the assignee of the subject invention.

The control memory storage of the word processor 10 also includes a further plurality of control memory storage registers utilized by the master program group for controlling interactions between various portions of the multiprocessor system. The master program group uses the fixed format language and arithmetic unit of the word processor 10 to provide a high rate of computing power.

In addition to the above-mentioned program control registers, used directly on programs execution, the word processor also includes control memory storage used for supervisory control purposes (e.g. memory protection), which are described herein.

A memory controller 16 operatively connects both processors 10 and 12 to a common memory system 13 which consists of a plurality of memory modules 14 labeled $M_1$–$M_n$. In the present embodiment, each module is composed of a plurality of "half" word storage locations, each having 24 bits. At the same time, a character of information is defined as having six information bits. Therefore, each memory module word locations contains the equivalent of four information characters. The memory controller 16 routes requests for access from the processors 10 and 12 for anyone of the modules $M_1$ through $M_n$. The memory system 13 includes independent memory paths 17 which enable the processors simultaneous access to different memory modules. However, when both processors request the same memory module, the memory controller 16 grants access to the module on a priority basis whereby the processor assigned the higher priority communicates with the module by way of a path 11.

Predetermined segments referred to in FIG. 1 as interprocessor communications (IPC) storage of one of the memory modules $M_1$–$M_n$ are used for interprocessor communications. More specifically, a segment of memory module $M_1$ of FIG. 1 has a number of sets of memory storage registers 15 (i.e. word storage locations) which are associated with the processors 10 and 12. Each storage register 15 consists of a number of fixed memory word locations which provide temporary storage for call messages being transferred between the two processors 10 and 12.

In the system of FIG. 1, a processor may call to request an action or data from another processor by encoding one or more "call" lines connected to the other processor. Before initiating the call, The processor loads the storage locations of the IPC storage reserved to it with a coded message explaining the reasons for the call. The message may be generated by either program or by hardware. The called processor responds by decoding the code applied to the call lines, performing the requested action and generating a response by encoding one or more lines connected to the calling processor.

By establishing communications between the two processors through the use of the preestablished segments of the common memory system 13, the interface between processor 10 and processor 12 is made considerably less complex. As illustrated by FIG. 1, only two lines, a call line 18 and a response line 19 are required to interconnect the two processors for communication.

In the illustrated embodiment, communications between the two processors 10 and 12 proceed indirectly through the control of the master program group of processor 10 primarily because of the disparity in data formats and because of other reasons later explained herein.

Therefore, when processor 10 calls processor 12, the processor 10 deposits the call message into a first group of memory word storage locations designated as IPC storage for P1 in FIG. 1, assigned to it, and signals the master program group. In similar fashion, the processor 12 when calling the processor 10, deposits the call message into a second group of memory word storage locations designated as IPC storage for P2 assigned to it, and then signals the master program group. In both instances, the master group software responds by issuing to the particular processor an appropriate call in the appropriate format. It is to be noted that since the word processor 10 and character processor 12 are multiprogrammed, communications between the two is more efficiently handled through the master group software.

SYSTEM MEMORY PROTECTION

The system of FIG. 1 employs a "lock" and "key" protection scheme in order to prevent programs from interfering with one another. A "key" is defined as a code number which is assigned under the control of the master program group to each program group. The "key" code is stored in a four-bit "-key" register associated with each program group in this system. A "lock" is defined as a code that is assigned to every memory block within the modules of the memory system 13. Each processor stores the "lock" codes assigned to it in a control memory storage table located within the processor (i.e. barricade table). Normally, the assignment is made by the monitor program working through the master group facility when a particular program is allocated memory space.

Briefly, the protection system operates as follows. Whenever a program instruction requests access to memory, hardware within the processor checks the "key" code of the program group which the word the instruction against the contents of the storage table. When the key code matches the "lock" code, access is permitted. However, when the key code does not match the "lock" code, access is inhibited, the offending program is turned off, and the master group is signaled by hardware that a barricade violation attempt has been made. The monitor program working through the master group may then take appropriate action such as dumping the offending program. The above operations and means for accomplishing same as they relate to the subject invention are described below in greater detail.

DESCRIPTION OF WORD PROCESSOR 10

Figure 2:
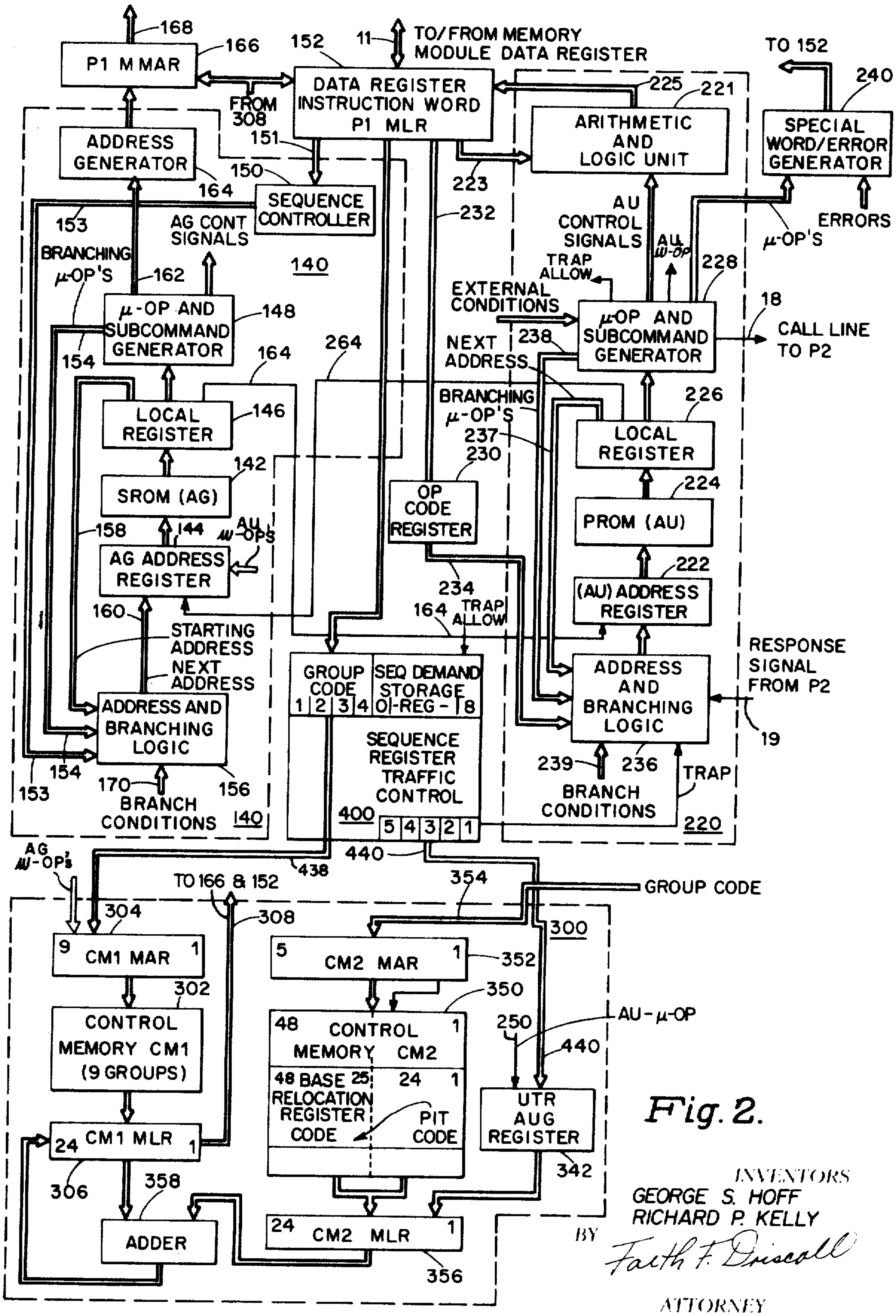
FIG. 2 discloses in greater detail, portions of the word processor 10 of FIG. 1.

Considering the portions of the system of FIG. 1 in more detail, reference is first made to FIG. 2 which discloses in block form, pertinent sections of the word processor 10. In this embodiment, the processor 10 is illustrated as comprising an address generating section 140, arithmetic section 220, control memory section 330 and sequence register traffic control 400. The address generating section 140 generates all memory addresses (i.e. control memory and main memory) and the interprocessor communication calls in conjunction with the arithmetic section.

The address generating section comprises a microprogrammed sequence control unit. The control unit consists of a control element 142, a control memory address register 144, an output local memory register 146 and a subcommand generator 148. The control element 142 is preferably an addressable, electrically alterable read only memory, designated as SROM in FIG. 1, which includes approximately 512 memory storage locations; each location having 120 bit positions. The control element 142 once started, cycles under the control of a master clock (not shown).

The memory address register 144, conventional in design, serves as a source of addresses for addressing any one of the plurality of storage locations of the control element 142. The contents of the addressed location are read out into the local storage register 146. The register 144 receives an initial or starting address from a sequence controller 150. The incremented contents of the address register 144 furnishes the next address during normal cycling of the control element 142. That is, the contents of the address register 144 are incremented by one during each cycling of the element 142 by an incrementor circuit (not shown), conventional in construction. Additionally, control signals applied along a sync line 264 through a gate (not shown) from the arithmetic section 220 (i.e. AU PROM) provide a further incrementing input to the register 144.

The 120 bit positions contents of each storage location store a control word coded to have a particular bit pattern. Each control word includes at least two distinct fields; these are an address field and a microinstruction field. The microinstruction field specifies which set of microoperations (i.e. $\mu$-ops) are to be performed during a particular cycle. More particularly, the subcommand generator 148 which comprises a series of decoding networks operates upon certain bits within the microinstruction fields to produce microoperation control signals (i.e. subcommand signals) which act to control the transfer of information through the gates and storage registers which comprise the processor 10.

The address field of each control word serves as a branch address which can specify conditionally or unconditionally the address of the storage location storing the control word to be read out during the next memory cycle. That is, the branching to the address specified by the control word currently residing in the local register 146 is instituted by the subcommand generator 148 or by external or internally generated signals identifying certain branching conditions. The former occurs when the microinstruction field specifies the presence of a branching microoperation (i.e. $\mu$-op). In such instances, the generator 148 applies control signals by way of a path 154 to an address and branching logic 156 which in turn applies, as a next address by way of a path 158, the address filed of the control word then stored in the register 146 to the address register 144. The transfer of the control address field to the address register 144 proceeds through a path 160.

In the second instance, the same branching logic 156 when conditioned by signals indicative of certain branch conditions, applied along a path 170, can select the next control word address.

In this drawing, as well as the other drawings, plural bit information flow paths are indicated by double lines while the single lines indicate single-bit information flow paths.

The subcommand generator 148 also is connected to supply subcommand signals along a path 162 to an address generator 164. The address generator 164 receives address information from main memory (i.e. memory system 13 of FIG. 1) through a data register 152 and sequence controller 150 along a path 151. As shown, the address generator 164 connects to supply addresses to main memory through a memory address register 166 along a path 168.

The arithmetic section 220 controls the manipulation of operands within the processor 10, cycling of the arithmetic unit, and generating of interprocessor communications calls with the address generator section 140. A microprogrammed sequencer control unit described herein also controls an arithmetic and logic unit 221 which manipulates data on a word basis.

Any arithmetic unit capable of manipulating data words may be used to perform the functions of the unit 221. The unit 221 includes a 48 bit accumulator, a 48-bit high-speed parallel binary adder, a 48-bit low-order product register and auxiliary word storage for multiples. For further details as to the construction of such an arithmetic unit, the U.S. Pat. No. 3,293,419 assigned to the assignee of the subject invention should be consulted. The above-mentioned adder may take the form of that described in U.S. Pat. No. 3,243,584 also assigned to the assignee of the subject invention. The arithmetic unit 221 further includes a special word error generator 240. The generator includes a number of gate buffer amplifiers (G-BA'S) connected to generate special code patterns, as further explained herein, in response to control signals applied thereto.

The control unit comprises an address register 222 connected to a read only memory control element 224, designated as PROM in FIG. 1, which comprises 2,048 storage locations; each storing 120 bits. The control element 224 connects to a local register 226 which, in turn, connects to supply control signals to a $\mu$-op and subcommand generator 228. An op code register 230 connects to receive information along a path 232 from the data register 152. The op code register 230 in turn supplies a starting address to the address register 222 through a path 234 by way of an address and branching logic 236. Additionally, control signals applied to a sync line 164 via a logic gate (not shown) from the address generating section (i.e. AG PROM) provide an incrementing input to the addressing register 222.

Each 120-bit control word stored in the control element 224 includes an address field and microinstruction field. As mentioned in relation to the address generator section 140, the address field of each Prom control word normally serves as a next address in which instance it is directly applied to the register 222. Additionally, the address field can be modified to serve as a branch address in which it can be applied by the address and branching logic 236 when it is conditioned either by signals representative of branch conditions applied on a path 239 or by control signals applied on a path 238 from the subcommand generator 228 upon its decoding of certain microinstruction fields. The modification of the address field is accomplished by either signals representative of external conditions or by the branching $\mu$-ops.

Additionally, the address and branching logic 236 connects to supply a predetermined address to the address register 222 when conditioned by a control response signal from the response line 19.

The subcommand generator 228 connects to provide subcommand control signals to the arithmetic and logic unit 221 and to the call line 18. These signals are derived from the group of bits stored in microinstruction field of each control word as it is read out into the register 226. The arithmetic and logic unit 221 receives word operands from memory by way of the data register 152 and a path 223. The data register 152 receives via path 225 for storage in memory the contents of the accumulator containing the results of a previous operation performed by the unit 221.

The $\mu$-op and subcommand generator 228 supplies control signals along a path 250 to an augment register 342 whose output is in turn applied to a control memory local register 342 CM2MLR. The augment register provides a means of transferring control to the master program upon the occurrence of special functions. Generally, when a special function occurs, it causes a particular one of a set of flip-flops to be switched to its set or "1" state so that they define an address unique to the special function. This address is used to augment one of the storage registers in control memory CMI wherein the contents read out are added to the constant generated by the generator 228 which is unique to the special function.

The control memory storage section 300 comprises a first control memory 302, referred to as CMI, and second control memory 350 referred to as CM2. The memory CM1 provides the requisite number of aforementioned control memory storage registers for each of the nine program groups. In the illustrated embodiment, the nine groups have 32 individually addressable special registers. The control memory CM1 is address through an address register 304 and the contents of the addressed location are read into a memory local register 306 which in turn selectively feeds via a path 308 the data register 152 and the memory address register 166.

The second control memory CM2, in the illustrated embodiment, comprises a split word memory organization for storing in a first half, the base relocation addresses, in addition to the "key" (PIT) code assigned to each of the program groups and in a second half, the stopper addresses for each group. The individual storage locations of the CM2 can be loaded directly via a 48-bit word memory local register, not shown. The base relocation register code corresponds to the initial or starting main memory storage location of the block allocated to the group.

Main memory addressing is done relative to the contents of the base address which is established by the supervisory program which works through the master program group. The key code, as described earlier, constitutes the protection tag assigned to the program group and is compared against the contents of the "lock" control storage table of the word processor 10, not shown. The stopper address denotes the upper address limit of a program group's assigned memory storage. Only the master program group has access to the contents of the control memory CM2, for either read out or modification.

The control memory 350 is addressed via a memory address register 352 which in turn receives a group code from a sequence traffic control 400 via a path 354. Switching the state of bit position "1" of address register 352 permits selective read out of either half of the full word contents of an addressed storage location into a memory local register 356, designed in FIG. 2 as CM2MLR. These contents are then transferred to either data register 152 or the memory address register 166. As shown, both transfers proceed via an adder 358 and the memory local register 306.

In the illustrated embodiment, the sequence register traffic control 400 provides multiprogramming control by establishing the sequence in which the program groups will run their programs. It should be noted that the invention is not limited to a hardware form of multiprogramming but may employ other known methods of multiprogramming (e.g. programming). Accordingly, the traffic control 400 will only be described herein to the level of detail that is necessary to understand the subject invention.

The control 400 includes a nine stage sequence demand storage register, each stage being associated with a different one of the nine program groups. The storage device stage associated with a particular program group may be set either by a manual switch or by an appropriate program instruction. When the device is set, this signifies that it respective program group is active (i.e. on). In addition, the traffic control includes a further bistable element, designed as a temporary off flip-flop, with each program group. When this flip-flop is in its set or "1" state, it overrides the group demand device and prevents the program group associated therewith from getting control.

The traffic control 400 also includes a four stage counter which during a cycle counts from zero to eight and back to zero. This count is decoded and compared with the contents of the demand storage register. If there is a comparison, the counter stops and its contents are transferred to a group register. The contents of the group register are in turn applied to the memory address register 302, designated as CM1MAR, via path 438 for addressing and read out of the contents of the program sequence counter specifying the next program instruction in the program being executed by the particular program group.

It should be noted that the master program group is also scanned along with the eight program groups, but usually remains inactive. More specifically, the master program group may be considered as having three operating modes: ready, hunt and no hunt. In the ready mode, the master group is inactive (i.e. its demand storage stage is set to a binary zero). It can be actuated as a result of certain interrupts and calls. For example, privileged instructions, designated as multiprogram control (MPC) instructions, which cannot be executed by a program group, when attempted to be executed are trapped by hardware to the master program group (i.e. activate the master group). In the hunt mode, as established by the binary "0" state of a further mode control flip-flop, together with the binary one state of the demand storage stage, herein referred to as no hunt flip-flop, the master program group operates as the ninth active program control group, cyclically sharing word processor cycles. When operating in the no hunt mode, as established by the binary "1" state of the no hunt flip-flop, the master program group, inhibits further program scanning and exclusively uses the word processor hardware.

For further details as to the construction of the traffic control 400, the aforementioned U.S. Pat. No. 3,029,414 should be consulted; while, for further details relating to the manner in which the address generation section 140 and arithmetic section 220 are implemented, reference may be made to pages 25–33 of volume II, number 1, of the publication entitled "-Honeywell Computer Journal" published by Honeywell Inc., Winter-Spring 1968.

DESCRIPTION OF CHARACTER PROCESSOR 12

Figure 3:
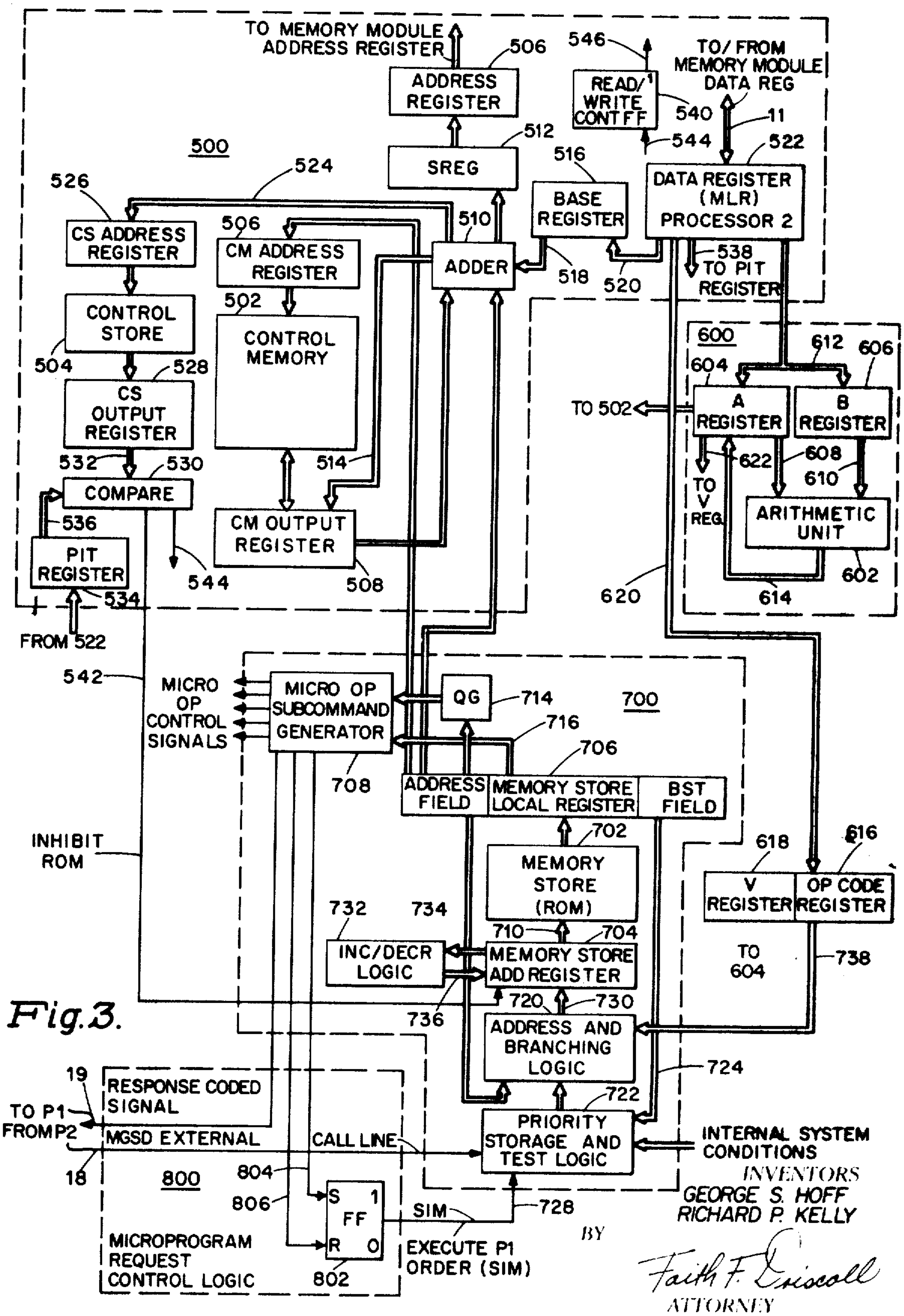
FIG. 3 discloses in greater detail portions of character processor 12 of FIG. 1.

Reference is now made to FIG. 3 which discloses in block form the pertinent portions of the present embodiment of character processor 12.

The pertinent portions of FIG. 3 comprise a memory portion 500, an arithmetic portion 600, a control portion 700 and a control request logic portion 800. A master clock, not shown, generates timing signals for synchronizing all the gates and register transfers within the character processor 12.

Considering each portion in greater detail, the memory portion 500 includes a control memory 502 and control store 504. Each memory is of well-known construction and comprises a multiplane, coincident current core storage unit which includes a plurality of multibit position storage locations constructed as described in U.S. Pat. No. 3,201,762 assigned to the assignee of the subject invention.

The control memory 502 stores information including addresses identifying the memory locations of instructions and data pertinent to the processing of programs. In a preferred embodiment, the control memory 502 includes A, B, C and D operand address registers, sequence and cosequence registers, present and starting location registers associated with input/output data transfer operations, and special working registers.

Control memory 502 addresses a storage location within any one of the memory modules 14 of FIG. 1 through an address register 506 connected to store a digital representation of which the address storage identifies locations within the memory module 14 being referenced during the access cycle. The address information contents read out of the control memory 502 are transferred to the address register 506 through a control memory local register (CMLR) 508, an adder 510 and a temporary storage register 512, referred to as S register. The adder 510 returns by way of a path 514 incremented or decremented versions of the transferred address to the register 508. These addresses are thereafter restored in the control memory 502 and used for subsequent addressing operations.

The adder 510 is connected to receive additional address information from a base relocation register 516 along the path 518. The base relocation register 516 facilitates the allocation of memory space by having the adder 510 add its contents to the addresses generated by control memory 502.

The register 516 receives address information by way of a path 520 from a data register 522. As shown, the data register 522 connects to communicate with any one of the memory modules 14 of FIG. 1 via the path 11.

The address contents of the register 508 (CMLR) subsequent to being modified by the contents of the base register 516 are used to address storage locations of the control store 504 by way of a path 524 and address register 526. An output memory register 528, referred to as CSLR, receives and temporarily stores contents of an addressed storage location within the control store 504. The register 528 connects to a comparator 530, conventional in design, by way of a path 532. The comparator 530 additionally receives an input from a "-key" register 534, referred to as PIT register in FIG. 3, by way of a path 536. The "key" (PIT) register 534 connects to the data register 522 through a path 538. The control signals produced by a comparison performed by comparator 530 are fed to the control portion 700 and to a write control flip-flop 540 respectively on lines 542 and 544. The flip-flop 540 in turn has its "1" side connected to an output line 506 which serves as an input to the memory system 13 of FIG. 1.

The control store 504 is used to implement the above-mentioned "key-lock" program protection technique and serves as a barricade table. Specifically, each of the storage locations of the control store 504 store different code combinations called "lock codes" for all of the different blocks of 512 main memory storage locations to which the processor 12 has access. The contents of the control store 504 are program loaded by the master group program and are not alterable thereafter by its processor. As mentioned earlier, whenever the processor 12 must perform an instruction requiring it to access memory, it first checks by addressing the control store 504, in a manner described herein, whether the code combination, referred as a "key code" of the instruction specifying the access to a particular block of memory, matches the "lock code" assigned to that block stored in the control store 504.

The arithmetic portion 600 of the processor 12 comprises a pair of operand storage registers 604 and 606, referenced in FIG. 3 as A register and B register respectively, which are connected through a path 608 and 610 to an arithmetic unit 602. The arithmetic unit 602 includes an adder capable of performing both binary and decimal arithmetic on a pair of character operands and may take the form of the unit described in the U.S. Pat. No. 3,400,259 assigned to the assignee of the subject invention.

In the preferred embodiment, the adder 510 is capable of operating on one, two, three or four character operands. Two additional registers 616 and 618 referenced as op code register and variant register respectively are provided for storing the operation code and the operation code modifier. The operation code, herein referred to as op code, defines the fundamental operation to be performed by the instruction. The op code modifier, or variant character, extends the definitions supplied by the op code. The op code register 616 receives an op code from register 522 via a path 620 while the variant register 618 is loaded from the A register via a path 622. The variant register in addition provides a path for loading the control memory address register 526 from maintenance panel switches.

The arithmetic portion 602 performs either numerical or logical operations on the character operands received from registers 604 and 606 which have been transferred thereto from the data register 522 by way of the path 612. The results of the arithmetic or logical operation performed on these operands are fed back to the register 604 by way of a path 614.

The control portion 700 which is a microprogrammed sequence controller comprises a memory store 702, a control memory address register 704, an output control register 706 and a microsubcommand generator 708. In the illustrated embodiment, the memory store 702 comprises an addressable electrically alterable read only memory having approximately 4,096 storage locations, each storage location containing 120 bit positions. The memory store 702 is addressed by the memory store address register 704, conventional in design, via a path 710.

The memory store local register 706, conventional in design, has the same 120-bit position capacity and temporarily stores the contents of an address storage location of the memory 702.

Each control word stored in a storage location of memory store 162 includes three distinct fields having lengths of 12 bits, 22 bits and 86 bits respectively. The 12-bit field, referenced as address field in FIG. 3, provides either control information or address information. That is, the 12-bit field provides control information by way of a path 712 which connects to a temporary storage register 714, referenced as QG. The 12-bits transferred to the register 714 are used to selectively interpret the 86-bit field of the same control word which is applied by way of a path 716 to the subcommand generator 708. Each different coding of the 12-bit field stored in the register 714 provides a different interpretation of the 86-bit field transferred to the subcommand generator 708. Once a particular coded 12-bit field is transferred to the register 714, it remains there throughout the processing of a single program instruction.

As mentioned above, the 12-bit field of each control word also serves as a control address which is transferred along a path 718 to an address and branching logic 720. The 22-bit field, referenced as BST in FIG. 3, is coded to identify branch test conditions. The 22-bit field is applied to a priority storage and test logic 722 along a path 724. The test logic 722 receives, via a path 726, control signals representative of internal system conditions. A further control signal SIM and an external call signal, referenced as MGSD, are applied respectively along a line 728 and a call line 18.

The 86-bit field is coded to indicate microoperations and this field conditions the subcommand generator 708 to provide sets of microoperations control signals which act directly to control the transfer of information within the processor 12 portions of the system of FIG. 1. Additionally, the subcommand generator 708 applied an additional output to response line 19.

The priority storage and test logic 722 connects to an address and branching logic 720 which serves as a source of address information for the memory address register 704. The branching logic 720 includes a plurality of storage registers, each associated with a different control flip-flop, herein termed "link" flip-flop. The priority logic 722 establishes an ordered recognition of the plurality of the branch addresses stored in a corresponding number of registers for a succeeding cycle of the control memory store 702. The link flip-flops are set either unconditionally when executing specific microinstructions or during specified cycles when certain test conditions, tested through the BST field, are present. Thus, when a condition tested for is established through a setting of one of the "link" flip-flops, the contents of its branch address register are transferred to the memory address register 704 via a path 730.

The memory storage address register 704 also uses as a further source of address information, an incremented-decremented version of the preceding address generated by an increment-decrement logic 732, conventional in design. This logic receives the contents of the memory address register 704 by way of a path 734 and returns the incremented or decremented address along a path 736. Therefore, the addressing and branching logic 720 applies address information either from increment logic 732 or the address from one of the branch registers included within the logic 720 to address register 704 via the path 730. Additionally, the address and branching logic 720 supplies as a starting address to the memory address register 704, the contents of the op code register 616. For additional details relative to the manner in which the control portion 700 is implemented, reference may be made to the corresponding U.S. application bearing Ser. No. 694,949 filed Jan. 2, 1968 which is incorporated herein by reference.

The mode control logic 800 includes a storage element 802 which has a pair of inputs for receiving control signals from the subcommand generator 708 via a pair of control lines 804 and 806. The storage device 802 has an output connected to the line 728. As illustrated, the storage device 802 in its simplest form constitutes a single flip-flop, conventional in construction. The control lines 804 and 806 connect respectively to the "1" or "set" and "0" or reset inputs of the storage element 802 while the "1" or "set" output connects to the line 728.

DESCRIPTION OF OPERATION

The operation of the subject invention will now be considered with reference to FIGS. 1, 1*a*, 2, 3, 4 and 5. It should be noted that during the normal execution of programs by the program groups of the word processor 10, each program group normally reaches a point in its program which requires the performance of a character-oriented operation as for example, having the results of a previous instruction be prepared for printout. Normally, such preparation involves the execution of one or more character oriented operations. In the illustrated embodiment, as mentioned previously, the hardware facilities of word processor 10 are tailored to perform word oriented operations and therefore do not include the facility for executing an operation which involves manipulating strings of characters.

In order to execute a character oriented operation, the processor 10 would normally have to enter a subroutine consisting of several instructions. By contrast, the hardware facilities of the character processor 12 in the illustrated embodiment are tailored to perform character oriented operations involving manipulation of variable length fields. Therefore, in accordance with the teachings of the present invention, a number of character oriented instructions included within the processor 10's normal repertoire are made available to each of the program groups of the word processor 10. The type of character instructions made available include:

Character edit (MCE), binary addition (A), decimal subtraction (S), decimal multiplication (MPY), extract (EXT), binary subtraction (BS), set word mark (SW), set item mark (SI), clear word mark (CW), clear item mark (CI), extend and move (WXM), and move and translate (MAT). The above list of instructions have been given for the purposes of illustration and should in no way be construed as being a limitation of the subject invention.

BRIEF DESCRIPTION OF OPERATION OF PROCESSOR 10 DURING NORMAL INSTRUCTION PROCESSING

Now referring to FIG. 2, when a program group of processor 10 is engaged in processing the instructions of its program, each instruction is readout from one of the modules of FIG. 1 into the data register 152 by way of the path 11. In the illustrated embodiment, the basic instruction format of the word processor 10 consists of three fixed length address fields herein referred to as A, B and C addresses. Other separate fields of the instruction word specify starting points (i.e. starting addresses) within each of the control elements 142 and 224.

In general, during the instruction phase of normal instruction processing, the sequence controller 150 first derives from the instruction word itself, the set of address generator microinstruction word sequences required to generate all the memory addresses used during the execution of the instruction. The sequence controller 150 generates an appropriate starting address for a first sequence for computing a first memory address.

The starting address is transferred from the path 160 into the AG address register 144; the transfer proceeding by way of the path 153 through the branching logic 156. The register 144 addresses the starting word location and its contents are read into the output register 146. The $\mu$-op and subcommand generator 148 decodes the microinstruction portion of the word and produces a set of subcommand signals (i.e. $\mu$-ops) which are applied to certain transfer gates within the word processor 10. In a similar fashion, the contents of successive word locations are read out and decoded. Successive word locations are sequenced through, incrementing the contents of the address register 144 by one during each memory cycle (i.e. during each clock time) until the last microinstruction word in the sequence is reached. At this time, the sequence controller 150 generates the starting address of the first microinstruction word of the next sequence. This starting address is transferred into the AG address register 144. As the address generator 164 completes the generation of each operand address, it transfers the address to the address register 166. When the memory controller 16 grants processor 10 access to memory, the contents of the memory word location specified by computed operand address are read out and transferred along the path 11 to the arithmetic and logic unit 221.

Upon reaching the last microinstruction word of the last sequence, the sequence controller 150 generates the starting address of the first microinstruction word in a sequence used to compute the first memory address for retrieving the first operand of the next program instruction word.

In the illustrated embodiment, the control memory element 142 stores approximately 54 different microinstruction sequences for computing memory addresses for the different types of addresses. These sequences vary in length from two to 102 words for generating main memory addresses for directing addressing and addresses for peripheral instructions.

Simultaneous with the sequence controller 150 generation of the starting address of a first sequence, the bits of the op code portion of the program instruction are transferred to the op code register 130. Upon the completion of the instruction phase of the processing, including retrieving the operands undergoing processing, the bit contents of the op code register 130 are transferred as a starting address to the AU address register 222; the transfer proceeding by way of the path 234 through the branching logic 236.

The storage word location addressed by the op code bits stores a microinstruction word whose address field specifies the address of the first microinstruction word of the microinstruction sequence which conditions the arithmetic and logic unit 221 for performing the particular operation on the retrieved operands specified the the op code portion of the program instruction. By having the op code bits indirectly specify the starting microinstructions word of a microinstruction sequence (i.e. microprogram) for executing the program instruction, several op codes can utilize the same microinstruction sequence. Indicator bits which produce sync signals on lines 164 and 264 are omitted from certain microinstructions in order to prevent either the AG SROM or AU PROM from advancing beyond certain points within their individual microinstruction sequences. For further details as to the coding of indicator bits, the copending application bearing Ser. No. 718,493 assigned to the assignee of the subject invention may be consulted.

In the illustrated embodiment, the AU control element 224, stores approximately 50 different microinstruction sequences which vary in length from four to 34 words.

With reference to FIG. 1 and flow chart 3, in the example considered herein, it is assumed that one of the program groups of word processor 10 is processing the set of instructions of the program stored in module 2 and has encountered an MPC instruction which the program group is unable to execute. More specifically, the MPC instruction signals the fact that program group has reached a point in its program which requires that a character-oriented operation (e.g. edit operation) be performed on the results of a previously executed add instruction in preparation for printout.

It is to be noted that the character processor 12 when executing a character instruction for one of the eight program groups would normally be required to address portions of main memory not allocated to it. Therefore, in order to simplify the hardware, afford maximum memory protection to each of the programs being executed by the different groups and simplify the memory relocation process, provision is made for having the monitor or supervisory program working through the master program group direct the character instruction in its proper format to the character processor 12. This is accomplished by tagging each character operation with a special object code. During the program compiling, a multiprogram control (MPC) instruction is inserted in place of each special object code.

Figure 4:
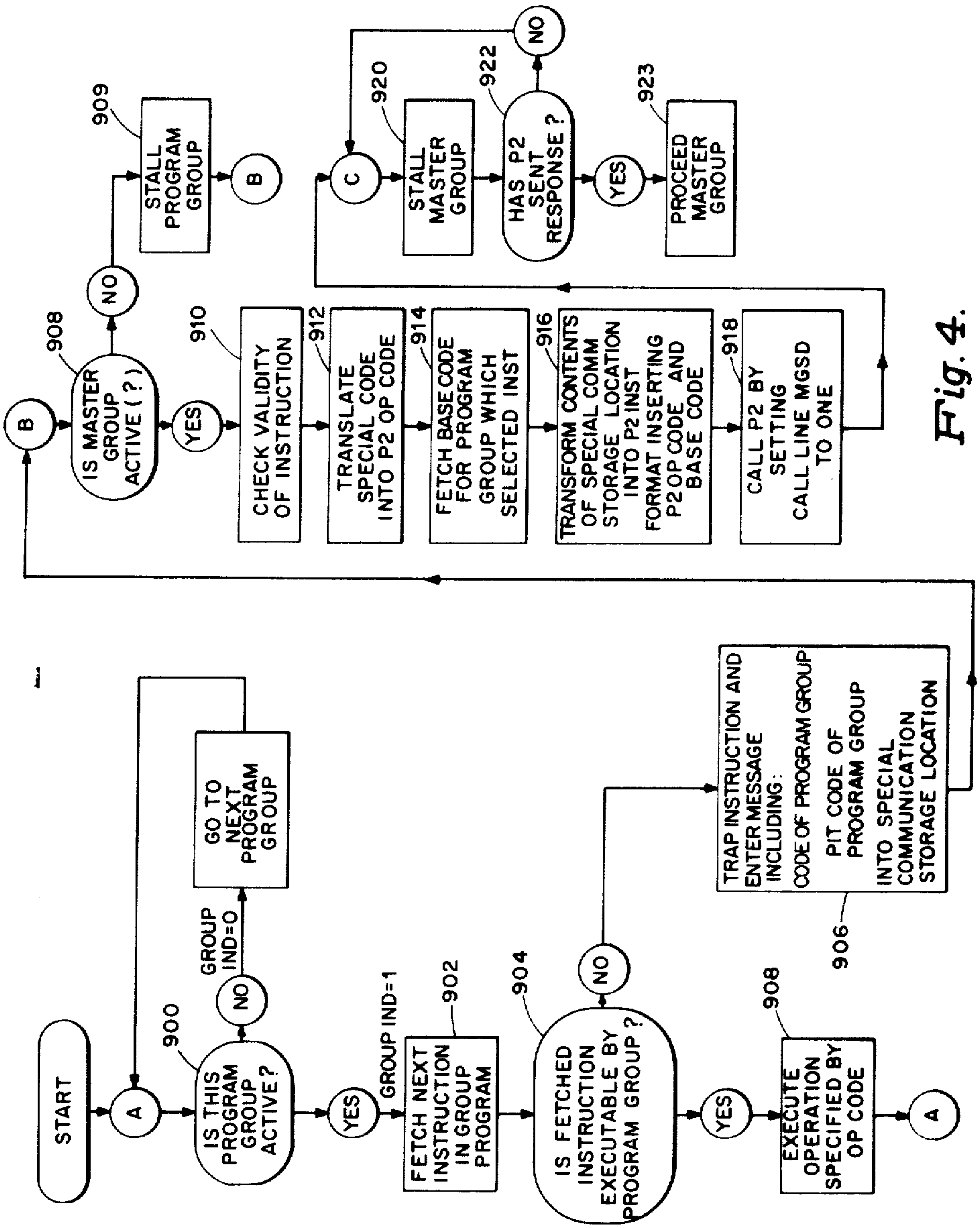
FIG. 4 is a flow chart illustrating the procedure followed by word processor 10 of FIG. 1 when processing a character-oriented instruction.

Now referring to block 900 of FIG. 4, since the program group processing the program stored in module 2 is assumed active, (i.e. the demand bit for the group is set to a binary "1" state) the next instruction in the program is fetched from the module and transferred via path 11 into the data register 152. The particular instruction read out, as mentioned earlier, calls out a character operation. The particular instruction, as mentioned earlier, takes the form of a multiprogram control (MPC) instruction which is a privileged instruction capable of being executed only by the master program group. The coding of the MPC instruction is as follows:

| | | | |
|---|---|---|---|
| 48 | | | 1 |
| Command | XXXXXXXXXXXXXXXX | B12...B9XXXXXX | XXXXXXX XXXXXXXX |
| Code | (A Address) | (B Address) | (C Address) |

Where the symbols *xxx*="don't care conditions" and further, where the command code=the operation to be performed;
the A address=the address where additional information pertinent to the execution of the indicated operation is located (e.g. the A address may specify the starting addresses of the control field and the data field used in an edit operation); the B address—bits B12–B9=the type of action to be taken; and the C address serves as an address for referencing additional information pertinent to the processing of that instruction.

For further details concerning the coding of the above instruction, pages 109–114 of the publication titled Honeywell H800 Programmer's Reference Manual Copyright 1964 should be consulted.

Then as block 904 of FIG. 4 indicates, the processor 10 determines whether or not the instruction can be executed by the particular program group. This is accomplished through a microinstruction sequence as follows. The bits of the op code portion of the MPC instruction word are transferred to the op code register 30 and then to the address register 222. The op code contents of address register 222 causes the PROM 224 to address a first microinstruction in a microinstruction sequence which determines what action is to be taken with respect thereto. First, the decoding of the first microinstruction by $\mu$-op generator 228, produces a subcommand signal which is applied as an input to address register 144 of the AG SROM 142. The AG SROM 142 is conditioned to address and read out a microinstruction which when decoded by subcommand generator 148 produces subcommand signals which condition address generator to generate a main memory working location address assigned to the master program group.

The next microinstruction readout from the AG SROM 142 when decoded produces a write signal which causes the C address of the MPC instruction to be written into the addressed working location.

During the next cycle, a further microinstruction is read out and is so coded as to produce a "sync" signal on line 164 which increments the address register 222 by one. Accordingly, a next microinstruction is read out from the AU PROM 224 into output local register 226. As a consequence, the AU PROM 224 applies a coded set of microop control signals unique to the op code of the MPC instruction as an input to the sequence register traffic control 400.

The function of block 904 is performed primarily by the traffic control 400. More specifically, the traffic control 400 includes a trap hardware decoder, conventional in design, which is conditioned by the aforementioned PROM bit code to decode the four bits (B12–B9) of the B address field applied thereto by way of data register 152. Since the MPC instruction is coded as being privileged, the traffic control 400 hardware decoder generates a trap control signal which in turn is applied to the address and branching logic 236 of the AU (PROM) 224. This signal forces an address into the address register 222 which in turn addresses a first microinstruction word of a microinstruction sequence for transferring control from the program group originating the trapped instruction, to the master program group. This transfer is effected as follows.

The AU PROM generates, during its sequence, a control signal which conditions the AG SROM to read out a microinstruction word which when decoded causes address generator 164 to generate the main memory address of the master group, communications IPC storage. Since the master group for all practical purposes constitutes a part of the word processor 10 it receives communication messages through the P1–IPC storage of FIG. 1.

In parallel with the above operation, the AU PROM during a next cycle reads out a microinstruction which conditions the word generator 240 to generate a first message word including a reason code, group code of last group, PIT code of program group and the C address if present. The AG SROM then by generating a write signal loads the information word into a first one of the word storage locations 15 of the P1 IPC storage. Next, in a similar manner, the AU generates a second word including status information relative to the processor 10 indicators and this word is loaded into a second one of the word storage locations 15.

During the next several cycles of the AG SROM, microinstructions read out into register 146 and decoded, generate control signals which condition various portions of the system for storage of the master group status. This includes sequential addressing of those locations of control memory 302 storing master group's sequence counter, cosequence counter and index register and transferring their contents to master group auxiliary registers in control memory CM1. As part of the same operation, the address contents of the sequence counter of the originating program group whose code is stored in the group register, are stored in a memory working location used by the master program for further reference.

In parallel with the above the AU PROM reads out and decodes the next microinstruction in sequence. This produces a control signal which when applied to the sequence register traffic control 400 causes it to generate the appropriate address constant which is in turn transferred to the UTR register 342. More specifically, the control 400 decodes the four-bit field (i.e. B12–B9) of the B address of the MPC instruction, identifying the nature of the special functions and derives an appropriate address constant therefrom. The AU PROM also generates a signal which causes an address to be transferred to register 144 which initiates the microinstruction sequence by which processor 10 executes an unprogrammed transfer. Specifically, the decoding by generator 148 of the next AG SROM microinstruction read out into register 146 produces control signals which condition address register 304 for addressing the unprogrammed transfer register of the originating group stored in control memory 304. The decoding of a further microinstruction by generator 148 produces control signals which causes the transfer of address contents read out into output register 306 to main memory address register via register 166.

A further set of control signals causes the violating (trapped) instruction of the originating group to be written into the addressed main memory storage location, (i.e. at the address contents of the originating group UPT-Register). At this time, the AU PROM is conditioned by a sync pulse on line 264 from the AG SROM to address and read out the next microinstruction in sequence. The decoding of the microinstruction by generator 228 produces a trap allow control signal which is applied to the traffic control 400. Upon the receipt thereof, the control 400 activates the master group by setting the mater program group mode flip-flop to the no hunt mode; rendering all other program groups inactive. The traffic control 400 then stores the state of the master group demand bit, clears its demand flip-flop and forces the master program group code into the group code storage. This action completes the transfer of control from the originating group to the master program group.

It should be noted that under normal circumstances, any program group originating an instruction which it could not execute, causing a trap, would be rendered inactive by the setting of its temporary off flip-flop to the binary "1" state. This would then prevent the program group from gaining control of the processor hardware. However, in the context of the present invention, the originating program group through the facility of the character processor 12 in effect executes the character instruction. Accordingly, the originating group will not be rendered inactive in these instances. Since the character processor is able to execute the character instruction within a short period of time, comparable to normal instruction times, the programs of active program groups are not delayed.

With the master program group in control, the AU PROM then generates a sync signal on line 164 which increments by one the address register 144, causing the AG SROM 142 to read out the next microinstruction. The decoding of this microinstruction by generator 148 causes the addressing of memory 302 for read out of master group's unprogrammed transfer register. The next microinstruction when read out the decoded conditions the adder 358 to add the contents of the UTR register 242 to the contents of the master group UTR register. During the next cycle, a further set of control signals conditions the various transfer gates to send the augmented address via register 166 to main memory as part of an instruction fetch cycle wherein the instruction stored in that address is read out from main memory then read into the data register 152. In parallel with the above operations, the AU PROM read out and decoded a microinstruction which caused clearing all conditions bringing the AU 221 to a recycling or null point. The AG SROM returns to an address point corresponding to the beginning of an instruction fetch microinstruction sequence. It will be appreciated that the above instruction is the first in a list of instructions by which the master group program executes the MPC instruction using the hardware of processor 10.

The master group program in performing the functions designated by blocks 910, 912, 914, 916 and 918 of FIG. 4 takes the communication message which calls for a particular character oriented operation and transforms it into a character instruction having the format of FIG. **1*a* and then calls processor 12. More specifically, the master program group software first examines the violating MPC instruction (see block 910), fetches from main memory additional parameters using a the A and C address fields of the MPC instruction and then signals processor 12 after it formulates the instruction using information previously stored in the communication storage of the processor 10. This process, as shown by block 912, FIG. 4 first, involves translating certain information bits of the MPC instruction into the appropriate character processor 12 op code; this may be effected by either a table lookup procedure or an indirect addressing procedure. In accordance with the present example, the op code written into the op code field is coded to specify an edit operation. In executing the function of block 914, the master program using the code of the originating program group to obtain base relocation address code (i.e. group code stored as part of message in the communications storage, addresses the appropriate group storage location of the control memory 350 through memory address register 352 via path 354**.

The base relocation address code of that group, stored in control memory 350 is selectively read out into memory register 356 (i.e. left half word) and then inserted into the appropriate position (i.e. see FIG. **1*a*) of the first word storage location communication storage, (IPC storage for P1). Additionally, the master program group in performing the function of block 916, either repositions within the first word location the previously stored PIT (key) code or writes therein the PIT code read out from control memory 350**.

Upon the completion of this last operation (i.e. block 916), the communications storage has stored an instruction having the format of that shown in FIG. **1*a*. The master program group then executes a last function that block 918 by which it causes a control signal to be applied to call line 18**.

The master group through microinstruction sets executes the above operations (e.g. list of special instructions) using the arithmetic section 220 and address generating section 140 hardware of the word processor 10 in the same way normal instructions are executed. Hence, the entire operation described above is executed within an extremely short period of time. It is to be noted that the last microinstruction word in the sequence of microinstruction sets followed by the AU PROM 224 is coded to contain a $\mu$-op which produces a control signal on call line 18. For example, the coding, in its simplest form, may be the insertion of a binary "1" into a predetermined bit position of the microinstruction word. The master program group is then stalled (i.e. loops—see block 920) until the word processor 10 is signaled by the character processor 12 that it has completed the execution of the operation specified by the P1 order.

Figure 5:
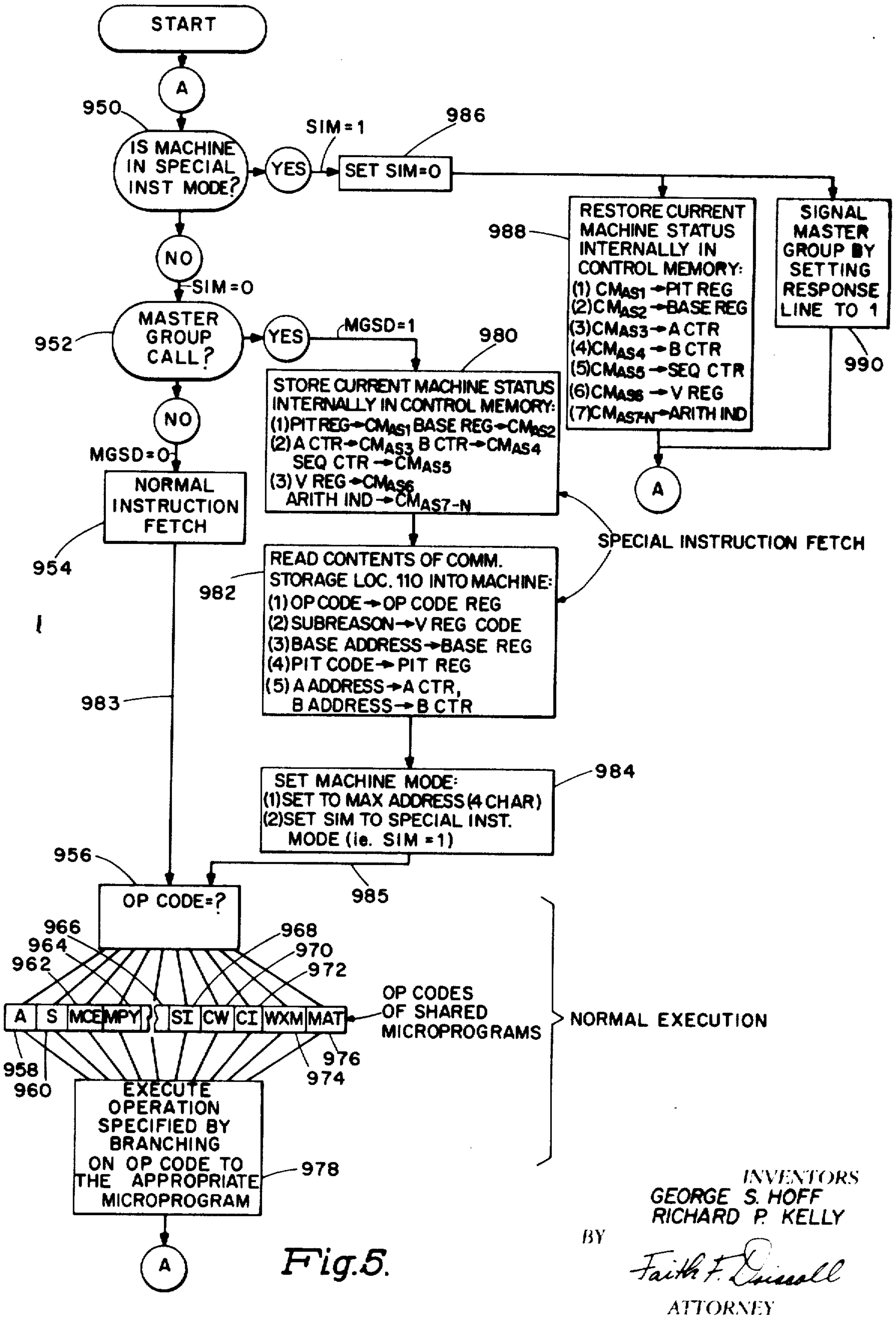
FIG. 5 is a flow chart illustrating the procedure followed by character processor 12 during its processing of a character instruction for a program group of processor 10.

Continuing on with the system operation, reference is now made to FIGS. 3 and 5. The subcommand control signal on the line 18 is applied as an input to the priority storage and test logic 722 of FIG. 3. In the present embodiment, this signal is applied as an input to the highest priority control flip-flop along with additional signals representative of other system conditions.

During normal processing, the processor 12, prior to fetching a next instruction, initiates a test procedure wherein it executes a sequence of test (BST) microinstructions for determining the presence of certain system conditions. More specifically, during each memory cycle, the contents of a different storage word location are read out into the output register 166 for decoding. Simultaneously therewith, the 22-bit branch on stored test field, referred as BST, is applied as an input to the priority storage and test logic 722. Signals generated from the bit pattern of the BST field of each microinstruction together with signals representative of conditions present (e.g. error conditions, interrupts, etc.) within the processor 12, set the control flip-flops associated therewith.

The line 18 and line 728 which apply the signals MGSD and SIM respectively are allocated the highest priority and therefore, are connected as inputs to the highest priority control flip-flop.

Successive microinstructions in the test sequence test for the presence of the signals MGSD and SIM. More specifically, first the function of block 950 is performed as part of a normal instruction fetch sequence wherein the bit pattern of the BST field of the first microinstruction word readout into register 706 conditions the priority logic 722 to test the state of the flip-flop 802. Because the flip-flop 802 is still in its reset state, the flip-flop 802 does not apply a signal to the line 788. Since the condition being tested (i.e. SIM=1) is not present, no branching takes place and the address register 704 uses the previous address contents, incremented by one.

The function designated by the block 952 of FIG. 5 is performed next. Specifically during the next cycle, the memory store 702 is addressed and the microinstruction of the specified storage location is read out into the output register 706. The BST field patter read out has been coded to test for the presence of a call signal (i.e. MGSD) on line 18 from the master program group. Accordingly, the test field pattern conditions the logic 722 and the presence of signal MGSD causes the control flip-flop associated therewith to be switched to its "1" state. Since the flip-flop set has been allocated the highest priority, the logic 722 transfers the contents of the branch address register associated therewith to the address register 704.

The specified starting address branched to within the memory store 702 marks the beginning of a sequence of microinstructions which performs the operations specified within blocks 980, 982 and 984. All of these operations may be considered as constituting a special instruction fetch wherein instead of retrieving the next instruction of the processor 12 program currently being executed, the processor 12 fetches from the communications storage locations of P1–IPC storage, the character instruction originated by one of the program groups of processor 10. By contrast, as illustrated by block 954 in FIG. 5, in the absence of the signal MGSD, no branching takes place and the processor 12 performs a normal instruction fetch wherein the next successive microinstruction is read out and decoded.

With reference to FIG. 3 and FIG. 5, each of the above operations (i.e. those specified in blocks 980, 982 and 984) will now be considered in greater detail. First, during the next several memory cycles, the microinstruction stored in the location specified by the aforementioned branch address, and the microinstructions stored in successive locations are read out into output register 706. The generator 708 decodes each of the microinstructions referenced and generates sets of microop control signals. These sets of control signals condition the various gates and registers within the processor to CMAS, the storage of the machine status which involves those transfers designated by the block 980. More specifically, a first set or group of control signals cause a transfer of the contents (i.e. key code) of the PIT register 534 to the control memory register 508, via a path not shown. Simultaneously therewith, further microop control signals condition memory address register 503 to address a first auxiliary storage location referenced as causes of control memory 502 and then to write the contents (i.e. key code) of the register 508 therein. In a similar fashion, via the decoding of a next microinstruction, the contents (i.e. base relocation address allocated to present program) of the base register 516 are transferred to register 508 and written into a second auxiliary storage location, referenced to $CMAS_2$, of control memory 502. This transfer proceeds via path 518. A further microop control signal produced by the same microinstruction causes the contents of the address register 503 to be incremented by one and the addressing of the second auxiliary storage location.

The decoding of subsequent sets of microinstructions produce groups of microops control signals which cause the contents of the A counter, B counter and sequence counter locations of control memory 508 to be successively addressed, read out into register 508 and rewritten respectively into auxiliary control storage locations $CMAS_3$, $CMAS_4$ and $CMAS_5$. The decoding of further sets of microinstructions causes a transfer of the contents of V register to a further auxiliary control storage location referenced as $CMAS_6$ and a transfer of system indicators (e.g. arithmetic) to auxiliary storage locations $CMAS_7$ through $CMAS_N$.

After the machine status has been stored, the decoding of a still further sequence of microinstructions performs the addressing and read out of the contents of the communication storage location 110 into the machine. This involves performing those transfers designated in block 982.

More particularly, concurrently with storing of the machine information, successive word locations of the module 1 of the FIG. 1 are addressed and the contents (i.e. the P1 order) of the word storage locations 15 of the communications storage are read out into the data register 522 along the path 11. Addressing of the word locations in module 1 is accomplished by the decoding of a first microinstruction which produces a group of control signals which transfer a bit representation of the address field portion of the same microinstruction word through the adder 510 and the S register 512 into the address register 506.

The subcommand generator 708 decodes further microinstructions thereby producing sets of subcommand signals which direct the transfer of the op code, the PIT code and the base relocation address respectively from the data register 522 into the op code register 618, the PIT register 534 and the base register 516. Additionally, the A and B operand addresses of the instruction read from a second word location 15 of the memory communication storage into the data register 522 are transferred to the control memory 502 for storage. Specifically, the bit patterns of the address fields from successively read and decoded microinstruction words are read into the address register 503 via the path 501. These addresses reference the A and B counters of the control memory 502 and the bit representations of the A and B addresses are written herein. The transfer of the A and B addresses proceeds via the data register 522 along a path (not shown) into the memory local register 508 of the control memory 502. All the transfers required to perform the above operations proceed under the direction of microop control signals produced by the decoding of individual microinstructions.

The last group of microinstructions in the sequence performs the functions designated in block 984. Mores specifically, the decoding of a first microinstruction produces a microop signal which is applied to the line 804 which in turn switches the flip-flop 802 from its binary "0" state to its binary "1" state. When set, the flip-flop 802 establishes the switching of the processor 12 from its normal processing mode to a "-special" processing mode. Additionally, further microop control signals switch the processor 12 into a four character addressing mode for maximizing main memory addressing.

Upon the completion of the above operations, processing flow enters block 956 with the processor 12 beginning the execution phase of instruction processing. It should be noted from FIG. 5, that subsequent to the fetching of the P1 order from communication storage, the control memory store 702 returns to a point which beings the normal execution phase of an instruction. This permits the usage of a sharing of the same microprograms employed by the character processor 12 to execute operations specified by instructions of its own programs. Thus, instead of expanding the size of memory 702 to accommodate special microprograms for executing operations for the different program groups of the word processor, the program groups use or share existing character processor microprograms (e.g. those designated by the codes in blocks 958 through 976). The foregoing is illustrated in FIG. 5 by the merging of lines 983 and 985 into block 956.

The function of block 956 is performed by the decoding of a further microinstruction which produces microop signals which transfer the op code bits from the op code register 618 along the path 738 into the address register 704 via logic 720.

These bits, as indicated by block 978, address a first storage location which stores the first microinstruction of the microprogram which directs the execution of the P1 order. In the example considered, the op code bits of the P1 order specify an edit operation; therefore, the microprogram designated by the code MCE in block 962 is selected. As mentioned above with reference to block 978, the edit operation is then performed using the edit execution microprogram whose starting location is specified by the op code contents of address register 704.

DESCRIPTION OF MEMORY ADDRESSING AND CHECK FOR STORAGE PROTECTION

During the execution of the specified character operation (e.g. edit), as part of the microprogram being executed, the processor 12 in order to reference information of the particular program group base relocates the A and B operand character addresses using the contents of the base register contents (e.g. base address of originating program group).

The above base relocation of the A and B operand character addresses is accomplished through the decoding of a microinstruction which conditions gates and registers for applying the contents of the base register 516 along the path 518 to the adder 510. The decoding of further microinstructions produce control signals which cause the base address to be added to the address contents of each of the A and B counters stored in control memory 502. That is, microop control signals produced by the decoding of the same microinstructions direct the read out of the A and B operand character addresses from the control memory 502 into local register 508 then to the adder 510. The base relocated results are fed to the register 512 and the control store memory address register 526 along the path 524. The contents of the register 512 are in turn transferred to address register 506 and thence to main memory address register of the module specified.

In parallel with the read out of the address specified, the hardware checks for storage protection. That is, the four-high-order bit positions of each of the A and B base relocated character addresses transferred into the address register 526 address certain ones of the storage locations of the control store 504. The contents of each of the addressed storage locations are read out into the output register 528 and compared with the contents of the PIT register 534. This comparison is performed by the comparator 538 which produces a signal on the line 504 which indicates the results of the comparison. For a "true" comparison, the comparator 538 applies a signal to line 504 while for a noncomparison the comparator 538 does not apply a signal to that line. All of the transfers necessary to accomplish the above mentioned operations proceed under the direction of microop signals produced by decoding the microinstruction bit patterns of successively referenced microinstructions.

As mentioned previously, storage protection is based on system of "locks" and "keys." It should be noted that normally, the processor 12 is not permitted access to areas of memory accessed by the program groups of the processor 10. Hence, none of the stored lock codes of the control store 504 normally assigned to the processor programs would match the "key code" stored in the PIT register 534. Accordingly, the comparator 100 would not produce the signal on line 504 and the flip-flop 120 would remain in its reset state. The reset state of flip-flop 540, in turn, inhibits the writing in of information into the location specified by the base relocated address.

In the above situation, simultaneously with the above inhibiting action, the comparator 538 produces a signal on line 542 which forces a predetermined bit pattern into the address register 164 and terminates further processing of that program instruction. The predetermined address bit pattern causes the referencing of the first of a sequence of microinstructions which when decoded produce subcommand signals directing the setting of certain error control flip-flops (i.e. read/write barricade violation). Additionally referenced sets of subcommand signals may cause both the signaling of the master group program and the generation of an appropriate message in the P2–IPC communication storage specifying the reason for the "call" or interrupt, (i.e. write barricade violation).

However, in the above example, it is assumed that the master group program software has previously loaded the control store 504 with "lock codes" of those program groups for which the processor 12 is required to execute character instructions. Hence, the master program group has given processor 12 the same memory identity as those program groups of processor 10. Accordingly, when the hardware checks storage protection by addressing the control store 504, the "lock code" of the originating program group read out compares favorably with the "key code" stored in key (PIT) register 534. At this time, the comparator 100 generates a signal on line 540 which switches the write flip-flop 540 from its binary "0" state to its binary "1" or set state. The flip-flop 540 in turn produces a write signal on line 526 directing the writing of information into the storage location specified by the base relocated address transferred from address register 506.

Continuing on with the system operation, reference is again made to FIG. 5. As indicated by point A, processing now returns to function block 950 upon the completion of the microprogram execution; completion being signaled in a conventional manner (e.g. word mark punctuation). In the manner described above, the function of block 950 is performed by testing the state of the flip-flop 802. Since the flip-flop 802 had been previously set to its binary "1" state, the signal, SIM, is applied on the line 184 as an input to the priority storage and test logic 722. Accordingly, a first microinstruction is readout and decoded. In this instance, the coding of the BST bit pattern in the presence of the signal SIM, switches the high priority control flip-flop to its binary one state. Accordingly, the contents of the branch register associated therewith are transferred into the address register 704. This causes the addressing of the first storage location of a microinstruction sequence which performs the functions designated in blocks 986, 988 and 990. Considering these functions in greater detail, subcommand generator 78 decodes a first microinstruction which produces sets of microop signals which switch the flip-flop 802 from its binary "1" state to its binary "0" or reset state. The decoding of further sets of microinstructions produce microop signals which restore the machine state. More specifically, in the manner previously described with respect to block 980, the contents of the auxiliary storage locations $CMAS_{1-N}$ are restored respectively to the PIT register 534, the base register 516, the A counter, B counter, sequence counter, V register and control indicators.

The decoding of successive microinstructions in the set produce the requisite microop control signals which perform the above-mentioned restoring operations (e.g. register transfers, control memory addressing, incrementing, replace and memory write signals). In parallel with the above restore operation, the subcommand generator 708 produces a further subcommand signal on the line 19 which performs the function of block 990. That is, the word processor 10 is signaled through its control element at the completion of edit operation and returns to normal processing.

This means that the master program group, still in control, performs the necessary operations to return the word processor 10 to its previous state (e.g. return the master group to its previous status). In greater detail with reference to FIG. 2, the signal on line 19 conditions the address and branching logic 236 of FIG. 2 and permits the AU PROM 224 to proceed to read out and decode the next microinstruction in sequence. The AU subcommand generator produces a signal on line 164 which forces a starting address into the address register 144. This address specifies the beginning of an instruction fetch wherein the address contents of the master group sequence counter register are read out and transferred to address register 166 and thence to main memory. The instruction stored in the specified location is read out from main memory and into data register 152. In the manner previously described, the instruction is executed (i.e. the op code branches the AU PROM 224 to a microinstruction sequence) thereby returning the master group to its previous state and allowing the traffic control 400 to select the next active program group.

The foregoing description has illustrated a multi processor system which includes a word oriented processor and character oriented processor. The system further includes means for permitting the word oriented processor to share facilities in the form of existing microprograms of the character oriented processor to execute those instructions occurring within the programs undergoing processing which specify operations more expeditiously performed by the character processor. It should be noted that in the illustrated embodiment, all microinstruction programs made available to the programs of the word processor use the same sequence of microinstructions for initial storage of the state of the character processor concurrent with the fetch of the word processor program group and the restoration of the state of the character processor upon its completion of microprogram execution. The above arrangement in addition to minimizing control memory storage reqUirements is extremely efficient. In actual practice, the character processor is able to perform the above mentioned operations, exclusive of microprogram execution, within 10 microseconds.

It is important to note that it is within the teachings of the present invention to include within the word processor means equivalent to that of the character processor for permitting the character processor to share the facilities of the word oriented processor to execute those program instructions more expeditiously performed by the word processor. In this arrangement, each processor through a sharing of each other's microprogramming facilities would be able to extend or augment its instruction set without increase in the storage requirements of each others control elements.

For the purposes of simplification the operation of the subject invention has been illustrated through flow charts containing a plurality of function blocks implemented through particular sets or sequences of microinstructions. Additionally, concurrent operations in some instances, are illustrated as if they occur in time sequence. For example, the testing of signals SIM and MGSD were described as occurring in sequence. In fact, both signals are tested simultaneously with the selection being resolved on a priority basis with the signal SIM assigned the highest priority.

The exact coding pattern for individual microinstructions were not disclosed since the engineer is free to select alternate forms of coding. For further details and insight into techniques for deriving such coding and to provide additional background information concerning the system and component features and to facilitate understanding of the description, the flowing references are incorporated by reference as a portion of this specification.

PRIOR ART MICROPROGRAMMING REFERENCES

1. "Microprogramming and the Design of the Control Circuits in an Electronic Digital Computer" by M. V. Wilkes and J. B. Stringer, Proc. Cambridge Phil. Soc., pp. 230 through 238, Apr. 1953 issue.

2 R. J. Mercer, "Microprogramming" in Apr. 1957 issue of Jour. Assoc. Computing Machinery, pp. 157 through 171.

3. U.S. Pat. Nos. 3,215,987; 3,245,044; 3,246,303; 3,258,748; 3,300,764; 3,302,183; 3,349,379; 3,380,025; 3,387,279; 3,389,376; 3,391,394; 3,400,371; 3,434,112, 3,444,527; 3,469,247.

4. Honeywell Computer Journal, Winter-Spring 1968, "-Model 4,200–8,200 Read-Only Memory Control Logic," by Stuart Klein and Scott Schwartz.

RELATED COPENDING APPLICATIONS

1. Copending patent application assigned to same assignee as this application: "Microprogram Control Apparatus" by Scott Schwartz, Ser. No. 694,928 filed Jan. 2, 1968.

2. Copending patent application assigned to same assignee as this application: "Method and Apparatus for Peripheral Device Assignment, and Validity Check and Relocation, if Assignment is Valid" by James B. Geyer and Victor M. Benson, Ser. No. 875,901 filed Nov. 12, 1969.

3. Copending patent application assigned to same assignee as this application: "Instruction Translation Control With Extended Address Prefix Decoding" by John Mekota, David Hudson, Thomas Rankin, Jean Champagne, Ser. No. 875,902 filed Nov. 12, 1969.

4. Copending patent application assigned to same assignee as this application: "Multiple Branch Technique" by George S. Hoff and Ming-Tzer Miu, Ser. No. 694,949 filed Jan. 2, 1968.

5. Copending patent application assigned to same assignee as this application: "Interlocking Data Subprocessors" by Victor M. Benson and Stuart K. Klein, Ser. No. 718,493 filed Apr. 3, 1968.

6. Copending patent application assigned to same assignee as this application: "Apparatus for Performing Arithmetic Operations on Numbers Using a Multiple Generating and Storage Technique" by Leonard Kreidermacher and David M. Hudson.

7. Copending patent application assigned to same assignee as this application: "Apparatus for Independently Assigning Time Slot Intervals and Read-Write Channels in a Multiprocessor System" by Robert Fischer, Ser. No. 771,147 filed Oct. 28, 1968.

8. Copending patent application assigned to same assignee as this application: "Microprogram Branch Control" by Leonard Kreidermacher, Ser. No. 875,910 filed Nov. 12, 1969.

It should also be noted that while the above-mentioned functions were implemented by sets of microinstructions (i.e. firmware), alternate implementations can also be employed. For example, the functions of each of the blocks may be performed by "hardwired logic," consisting of known decoding and counter arrangements. For examples of such logic, reference may be made to the text titled "Computer Design Fundamentals" by Chu, McGraw-Hill Book Company, Inc., Copyright 1962, in particular, the material in chapter 11.

To prevent undue burdening the description with matter within the ken of those skilled in the art, a block diagram approach has been followed, with a detailed functional description of each block and specific identification of the circuitry it represents. The individual engineer is free to select elements and components such as flip-flop circuits, shift register, etc. from his own background or from available standard references such as Arithmetic Operations in Digital Computers by R. K. Richards (Van Nostrand Publishing Company), Computer Design Fundamentals by Chu (McGraw-Hill Book Company, Inc.), and Pulse, Digital and Switching Waveforms by Millman and Taub (McGraw-Hill Book Company, Inc.).

While in accordance with the provisions and statutes there has been illustrated and described the best form of the invention known, certain changes may be made to the system described without departing from the spirit of the invention as set forth in the appended claims and that in some cases, certain features of the invention may be used to advantage without a corresponding use of other features.

Having described the invention, what is claimed as new and novel and for which it is desired to secure Letters Patent is:

1. In a multiprocessor system, the combination comprising:
   - memory means for storing instructions of at least first and second programs;
   - a first processor operating with a predetermined instruction set, said processor including a first control element for conditioning said processor to independently execute those instructions of said first program, said first control element including means for detecting instructions not within its instruction set and generating an out of set signal;
   - a second processor operating with a different instruction set from said first processor, said second processor including a second control element for conditioning said second processor to execute independently instructions of said second program; and, logic means directly interconnecting said first and second control elements, said logic means in response to said out of set signal to condition said second control element to execute said out of set instruction sharing the same control facility said second processor uses to execute instructions of that kind occurring within its own program.

2. In a multiprocess system, the combination comprising:

memory means for storing program instructions of at least first and second programs;

a word processor operating with a predetermined instruction set and word data format, said processor including a first control element for conditioning said processor to independently execute those instructions of said first program, said word processor further including decoding means coupled to said first control element for trapping instructions specifying character oriented operations and generating a trap control signal for conditioning said first control element to generate a call signal;

a character processor operating with a different instruction set from said word processor and variable length data format, said second processor including a second control element to execute character oriented instructions of a second program; and, logic means directly interconnecting said first and second control elements, said logic means in response to said call control signal from said first control element to condition said second control element to execute the operations specified by said character oriented instructions sharing the same control facility said second processor uses to execute instructions of that kind occurring within its own program.

3. In a multiprocessor system, the combination comprising:

memory means for storing instructions of at least two different program segments, said memory means comprising a plurality of memory locations, a predetermined number of which are used for interprocessor communications;

a word processor operating with a predetermined instruction set and word data format, said processor including a first microprogrammed control element for conditioning said processor to independently execute those instructions of a first one of said program segments, said word processor further including decoding means for generating a trap control signal upon trapping an instruction specifying a character oriented operation executable by instructions not within its set, said first control element conditioned by said decoder trap signal to deposit a translated form of said trapped instruction in a predetermined one of said interprocessor communication storage locations and generate a first control signal;

a character processor operating with a different instruction set from said word processor and variable length data format, said second processor including a second microprogrammed control element including a plurality of microprograms used by said second processor during its normal operaTion to execute character instructions of said second one of said program segments and a special microprogram sequence for simulating the normal extraction of a next instruction; and, mode control means directly interconnecting said first and second control elements, said mode control means responsive to said first control signal from said first microprogrammed control element to condition said second control element to switch said mode control means to a predetermined state, said second microprogrammed control element being conditioned by said mode control means when in said predetermined state to execute said special microinstruction sequence for fetching said instruction from said interprocessor communication storage location simultaneous with storing its previous state, said second processor being operative thereafter to branch a predetermined one of said microprograms for executing the operation specified by said translated instruction.

4. A data processing apparatus for extending the instruction set of at least one processor of a multiprocessor system, said multiprocessor system including at least first and second processors with different instruction sets, addressable memory storage means including a plurality of storage locations some of which store program instructions of at least first and second programs, said first processor including control means operative during the execution of instructions of said first program to trap instructions including operation codes not within its instruction set and generaTe a first external control signal, said data processing apparatus including said second processor and comprising:

a microprogrammable control element being directly coupled to said control means, said control element including means for storing a plurality of microprograms referenced by said data processing apparatus during its execution of instructions of said second program and a first microinstruction sequence for simulating operations of the normal extraction of an instruction; and, program switching means including at least first and second states, said microprogrammable control element responsive to said external control signal for switching said program switching means from said first state to said second state, said switching means operative to condition said microprogrammable central element to switch said processor to a special mode wherein said control element generates a sequence of control signals from said first set of microinstructions which condition second processor to fetch said trapped instruction concurrent with storing the program state of said second processor and execute the operation specified by the operation code through one of the microprograms used for processing instructions of its own program, whereby said first processor is allowed to share all microprograms of said second processor.

5. In a multiprocessing system comprising:

memory storage means including a plurality of storage locations adapted for storing program instructions of at least two programs, at least two processors having different instruction repertoires, a first one of said processors including means for detecting an instruction not within its repertoire, each processor including a microprogrammed control element including a plurality of microprograms for independently executing instructions of at least one of said programs, and said system further including means for directly connecting at least one output of each microprogrammed control element as an input to the other microprogrammed control element and program switching means for switching one of said two processors between a normal mode and a special mode, said program switching means comprising;

bistable storage means having at least first and second states, including an input circuit, and an output circuit, means connecting said bistable storage means to an output of the microprogrammed control element of the first one of said processors, said output circuit connected as another input of the microprogrammed control element of the second of said processors, said bistable means when in said first state operative to condition said second processor to operate in a normal mode wherein it executes instructions of its own program under the control of said microprogrammed control element, and said bistable means operative upon the receipt of a first control signal from said output in response to said microprogrammed element of said second processor being conditioned by said microprogrammed element of said first processor in response to detecting an instruction not within its repertoire, to be switched from said first state to said second state wherein said bistable means conditions said control element of said second processor to switch said processor to a special mode wherein said processor fetches a program instruction of said first processor and executes same using the same microprogram it normally uses to execute instructions of its own program.

6. A multiprocessor system comprising:

memory means comprising a plurality of memory modules each comprising a plurality of memory storage locations, groups of said memory locations of predetermined ones of said memory modules assigned to store instructions of a different one of a plurality of programs and one of said memory modules including a predetermined number of fixed storage locations assigned for interprocessor communications;

a first multiprogrammed processor operating with a predetermined instruction set, said processor including a first microprogrammed control element for conditioning said processor to independently execute instructions for a number of said plurality of programs, each program being designated by a group coded and assigned a different memory protection code, one of said programs being assigned a master control function for said system, said first processor further including a multiprogrammed traffic control means for scanning each of said programs and assigning cycles to active ones of said programs;

a second processor operating with a different instruction set, said processor including a second microprogrammed element for storing a plurality of microprograms used by said processor during its normal operaTion to execute instructions of at least one of said plurality of programs and a first special control sequence for executing operations which simulate a normal extraction of an instruction;

said first processor further including decoding means connected to said first control means and being operative to trap operation codes of instructions not executable by said programs, said control means being conditioned by a trapped control signal from said decoder means to condition said first control element to transfer program control from the program originating said trapped instruction to said master program, said first control element being operative to execute a sequence of operations specified by said master program to translate each of said trapped instructions into an instruction including an operation code executable by said second processor in addition to address information pertinent to referencing the area of memory assigned to said originating program and then to store said translated instruction in an appropriate one of said communication storage locations; and, means directly interconnecting said first and second microprogrammed control elements, said means responsive to a signal from said first control element to condition said second control element for having said second processor enter a special mode wherein said processor executes said special control sequence wherein it fetches said translated instruction from said communications storage location simultaneously with storing information pertinent for returning to the program being executed by said second processor, said second control element being conditioned by the opcode of said translated instruction to reference one of the microprograms normally referenced by said processor to execute like operations specified by instructions of its own programs.

7. The system of claim 6 wherein said first multiprogrammed processor further includes a memory means comprising a plurality of storage locations for storing said key codes and base addresses for each of said programs, and wherein said master program directs said first control element during said translation of said trapped instruction to reference the key register and base register assigned to said originating program and insert the contents thereof into said communication storage location as part of said translated instruction for transfer to said second processor.

8. The system of claim 6 wherein said trapped instruction is coded as a privileged instruction, and said master program directs said first control element to translate the opcode of said privileged instruction into an appropriate one of the opcodes within the repertoire of said second processor.

9. The system according to claim 5 wherein said first processor is a word oriented processor having a word data format and said second processor is a character oriented processor having a variable length data format.

10. The system according to claim 8 wherein said opcodes of said translated instructions are within the class of opcodes which specify character oriented operations.

11. The system of claim 6 wherein said translated instruction includes control information associated with said originating program for allowing said second processor to access those areas of memory assigned to said originating program during execution of said translated instruction.

12. The system according to claim 11 wherein said control information includes a key code and base address code.

13. The system of claim 6 wherein said memory means is protected by a system of lock and key codes, said second processor further including a memory store comprising a plurality of memory storage locations for storing a number of lock codes assigned to a corresponding number of memory blocks to which said second processor has access;

said second processor further including a key register for storing a key protection code assigned to the program being executed by said second processor, said second microprogrammed control element preliminary to the execution of said translated instruction being operative to execute said first special control sequence, store the contents of said key to register and load said register with a key code assigned to said originating program contained within said translated instruction for comparing the key register contents to a lock code associated with addressed memory locations for determining whether said second processor has been previously granted access hereto.

14. The system of claim 13 wherein said second processor further includes means for generating a first signal when both of said key codes compare equally and a write inhibit second signal when both codes do not compare equally for inhibiting writing into the memory storage location being addressed, and said second microprogram control element including a further microinstruction control sequence, said second control element being conditioned by said write inhibit signal to reference said further microinstruction sequence for signaling said first control element and said master program of a write violation.

15. The system of claim 13 wherein said second processor further includes a base register, said microprogrammed control element during the execution of said special control sequence in addition to storing said key code, stores the base address code contents of said base register of said program and said base register with the base address assigned to said originating program for comparing said key register contents with lock codes associated with base relocated memory address locations.

16. A system according to claim 6 wherein said first processor further comprises address generating means and arithmetic and logic means, said address generating means comprising a microprogram control element for providing microinstructions for directing the operations of said address generator and said arithmetic and logic means comprising a second microprogram control element for providing microinstructions for directing the operations of said arithmetic means whereby said address generating means and said arithmetic and logic means operate concurrently during the processing of instructions of said plurality of active programs.

17. The system according to claim 6 wherein said first processor further includes a control memory having a plurality of memory groups, each of which comprises a plurality of memory storage locations, said multiprogrammed traffic control means connected to said control memory to select storage locations within different ones of said groups in accordance with programs that are active.

18. The system of claim 6 wherein said interconnecting means includes a call line and a response line for signaling respectively a request for a microprogram of said second processor and the completion of microprogram execution of said microprogram requested.

19. The system of claim 6 wherein said microprogrammed control element of said second processor further stores a control sequence for causing said element to generate an external response signal upon completing the execution of said microprogram simultaneous with causing said second processor to execute operations for the restoring of said information pertinent to returning to said program it was previously executing.

20. In a multiprocessor system, the method of extending the instruction set of a first processor by sharing microprograms between at least one other processor of said system, said method comprising the steps:

storing a plurality of microprograms in microprogrammed control elements individually associated with each of said two processors for controlling the execution of different types of program instructions within said two processors;

generating in response to the operation code of each of those instructions of a program assigned to said first of said two processors which are to be executed by sharing microprograms stored in the microprogrammed control element of a second of said two processors, a first control signal to trap each said instruction and for conditioning said microprogrammed control element to sequence through a microinstruction sequence including a predetermined microinstruction word coded to generaTe an external control signal therefrom:

generating first and second sets of control signals from first and second microinstruction sequences stored at predetermined points within the microprogrammed control element of said second processor, said first set of said signals of said first sequence being used to simulate a normal instruction FETCH to fetch said trapped instruction and simultaneous store the machine state of its processor, said first sequence being coded to merge with said plurality of microprograms stored within said microprogrammed control element, said second set of control signals of said second sequence being used to restore said machine state and simultaneously generate a response signal to said first processor signaling the completion of microprogram execution; and sensing said external control signal applied to the control element of said second processor, and conditioning said control element to generate said first and second sets of signals to execute said first sequence, and said second sequence after said processor executes a microprogram selected through the operation code of said trapped instruction which is normally used to execute like operations specified by instructions of its own program.

21. In a multiprocessor system, the method of extending the instruction set of a first processor by sharing microprograms stored in the microprogrammed control element of at least one other processor of said system whose instruction set is different from that of said first processor, said method comprising the steps of:

generating in response to the operation code of each of those instructions of a program assigned to said first processor which are to be executed by said other processor a first control signal to trap each said instruction and to condition said microprogrammed control element to sequence through a predetermined microinstruction sequence which generates an external control signal;

generating in response to said external control signal a first set of control signals from a first special microinstruction sequence stored at a predetermined point within said microprogrammed control element of said second processor, said first set of signals for conditioning said other processor to fetch each said trapped instruction and concurrently store the machine state of said other processor; and, said special sequence conditioning said processor to sequence to a point common to said microprograms stored therein and thereafter causing the selection of a microprogram to perform the operation designated by said trapped instruction which said other processor uses to execute like operations specified by instructions within its own program.

* * * * *

UNITED STATES PATENT OFFICE
CERTIFICATE OF CORRECTION

Patent No. 3,631,405 Dated December 28, 1971

Inventor(s) George S. Hoff, et al

It is certified that error appears in the above-identified patent and that said Letters Patent are hereby corrected as shown below:

Column 23, line 60, column 24, line 13, column 25, line 28, cancel "T" and insert -- t -- . Column 26, line 54, after "and" insert -- loads -- .

Signed and sealed this 31st day of October 1972.

(SEAL)
Attest:

EDWARD M.FLETCHER,JR.
Attesting Officer

ROBERT GOTTSCHALK
Commissioner of Patents